US011304064B2

(12) United States Patent
Choi et al.

(10) Patent No.: US 11,304,064 B2
(45) Date of Patent: Apr. 12, 2022

(54) METHOD FOR EXPANDING WIRELESS COMMUNICATION AND ELECTRONIC DEVICE THEREFOR

(71) Applicant: Samsung Electronics Co., Ltd., Suwon-si (KR)

(72) Inventors: Sehwan Choi, Suwon-si (KR); Jaeyoung Shin, Suwon-si (KR); Woosup Lee, Suwon-si (KR); Jungsik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 16/804,411

(22) Filed: Feb. 28, 2020

(65) Prior Publication Data
US 2020/0280861 A1 Sep. 3, 2020

(30) Foreign Application Priority Data

Feb. 28, 2019 (KR) .......................... 10-2019-0024305

(51) Int. Cl.
*H04W 4/00* (2018.01)
*H04W 16/26* (2009.01)
(Continued)

(52) U.S. Cl.
CPC ............ *H04W 16/26* (2013.01); *H04W 4/80* (2018.02); *H04W 68/005* (2013.01); *H04W 76/11* (2018.02)

(58) Field of Classification Search
USPC ................... 370/328, 329, 330; 340/539.13
See application file for complete search history.

(56) References Cited

U.S. PATENT DOCUMENTS 8,583,044 B2 11/2013 Dua
9,288,228 B2 3/2016 Suumaki
(Continued)

FOREIGN PATENT DOCUMENTS

CN 101149782 A 3/2008
KR 10-2017-0010280 A 1/2017
(Continued)

OTHER PUBLICATIONS

International Search Report dated Jun. 22, 2020 in connection with International Patent Application No. PCT/KR2020/002812, 3 pages.
(Continued)

*Primary Examiner* — David Q Nguyen

(57) ABSTRACT

A first electronic device for expanding a wireless communication includes a first RAT communication unit for transmitting a signal to or receiving a signal from a reader via a first radio access technology (RAT). the first electronic device also includes a second RAT communication unit for transmitting a signal to or receiving a signal from at least one second electronic device via a second RAT. The first electronic device further includes a processor for transmitting, to the at least one second electronic device, a message requesting to initiate a communication using the second RAT, and performing control such that a communication using the first RAT between the at least one second electronic device and the reader is performed by using the second RAT.

19 Claims, 15 Drawing Sheets

(51) Int. Cl.
*H04W 4/80* (2018.01)
*H04W 76/11* (2018.01)
*H04W 68/00* (2009.01)

(56) References Cited

U.S. PATENT DOCUMENTS

| | | | |
|---|---|---|---|
| 9,743,440 B2* | 8/2017 | Wietfeldt | H04W 76/14 |
| 9,985,950 B2* | 5/2018 | Caterino | H04W 12/068 |
| 2007/0197261 A1 | 8/2007 | Humbel | |
| 2014/0180923 A1 | 6/2014 | Choi | |
| 2014/0197948 A1* | 7/2014 | Mo | H04W 64/00 |
| | | | 340/539.13 |
| 2014/0213188 A1 | 7/2014 | Kim et al. | |
| 2015/0039494 A1 | 2/2015 | Sinton et al. | |
| 2016/0005287 A1* | 1/2016 | Yamaoka | G08B 21/0272 |
| | | | 340/539.13 |
| 2016/0117904 A1* | 4/2016 | Song | G08B 21/0269 |
| | | | 340/539.13 |
| 2017/0013457 A1 | 1/2017 | Polak et al. | |
| 2018/0315276 A1* | 11/2018 | Persson | G07F 17/3216 |
| 2019/0206195 A1* | 7/2019 | Kido | G07F 17/3213 |

FOREIGN PATENT DOCUMENTS

| | | |
|---|---|---|
| KR | 10-1871052 B1 | 6/2018 |
| WO | 2016/178082 A1 | 11/2016 |

OTHER PUBLICATIONS

Written Opinion of the International Searching Authority dated Jun. 22, 2020 in connection with International Patent Application No. PCT/KR2020/002812, 6 pages.
Supplementary European Search Report dated Feb. 18, 2022, in connection with European Application No. 20762116.0, 6 pages.

* cited by examiner

METHOD FOR EXPANDING WIRELESS COMMUNICATION AND ELECTRONIC DEVICE THEREFOR

CROSS-REFERENCE TO RELATED APPLICATION

This application is based on and claims priority under 35 U.S.C. 119 to Korean Patent Application No. 10-2019-0024305, filed on Feb. 28, 2019, in the Korean Intellectual Property Office, the disclosure of which is herein incorporated by reference in its entirety.

BACKGROUND

1. Field

The disclosure relates to a method for expanding a wireless communication and an electronic device therefor.

2. Description of Related Art

A near field communication (NFC), which is one of wireless communication technologies, can be established within a distance of 10 cm, for example, when a terminal is brought close (tapping or tagging) to an NFC reader, an authentication procedure is performed via NFC, based on identification information of the terminal. The current NFC is designed based on a standard, namely ISO14443, and since NFC operates within a near field, NFC has excellent security and enables a two-way communication. In order to provide such NFC, an infrastructure with respect to the NFC reader communicating with the terminal is required.

The above information is presented as background information only to assist with an understanding of the disclosure. No determination has been made, and no assertion is made, as to whether any of the above might be applicable as prior art with regard to the disclosure.

SUMMARY

Since the existing NFC can be established within a distance of 10 cm, a terminal should be brought close to the NFC reader. In this case, an ultra-wide band (UWB) communication, which can coexist with the existing wireless communication service without acquiring a separate frequency resource, can be applied. The UWB communication refers to a communication technology using a wide frequency band in a broad sense, and implies a wireless transmission technology occupying a frequency bandwidth which is equal to or greater than 20% of the central frequency or 500 MHz. That is, when the UWB communication is applied to the existing NFC infrastructure, a high speed communication becomes possible from approximately several meters to several tens of meters, so that an authentication procedure can be performed without contacting the terminal to the NFC reader.

An embodiment provide a method for expanding NFC between an electronic device and an NFC reader by using an expansion device linked to the existing NFC infrastructure, and an electronic device therefor.

According to an embodiment, a first electronic device for expanding a wireless communication may include: a first RAT communication unit for transmitting a signal to or receiving a signal from a reader via a first radio access technology (RAT); a second RAT communication unit for transmitting a signal to or receiving a signal from at least one second electronic device via a second RAT; and a processor for transmitting, to the at least one second electronic device, a message requesting to initiate a communication using the second RAT, and performing control such that a communication using the first RAT between the at least one second electronic device and the reader is performed by using the second RAT.

According to an embodiment, a second electronic device may include: a first RAT communication unit for transmitting a signal to or receiving a signal from a reader via a first radio access technology (RAT); a second RAT communication unit for transmitting a signal to or receiving a signal from a first electronic device via a second RAT; and a processor for receiving, from the first electronic device, a message requesting to initiate a communication using the second RAT, and performing control such that a communication using the first RAT with the reader is performed via the first electronic device by using the second RAT.

According to an embodiment, an operation method of a first electronic device for expanding a wireless communication may include: transmitting, to at least one second electronic device, a message requesting to initiate a communication using a second RAT; acquiring, from the at least one second electronic device, identification information of the at least one second electronic device via a communication using the second RAT; transmitting, to a reader, the acquired identification information of the at least one second electronic device via a communication using a first RAT; and performing a communication using the first RAT between the at least one second electronic device and the reader by using the second RAT.

The method and the electronic device therefor according to an embodiment can establish NFC at a greater distance by means of linkage between the existing NFC infrastructure and an UWB, so that NFC is possible without contacting, by a user, a terminal to an NFC reader.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, referring to attached drawings, an embodiment will be described in detail.

Figure 1:
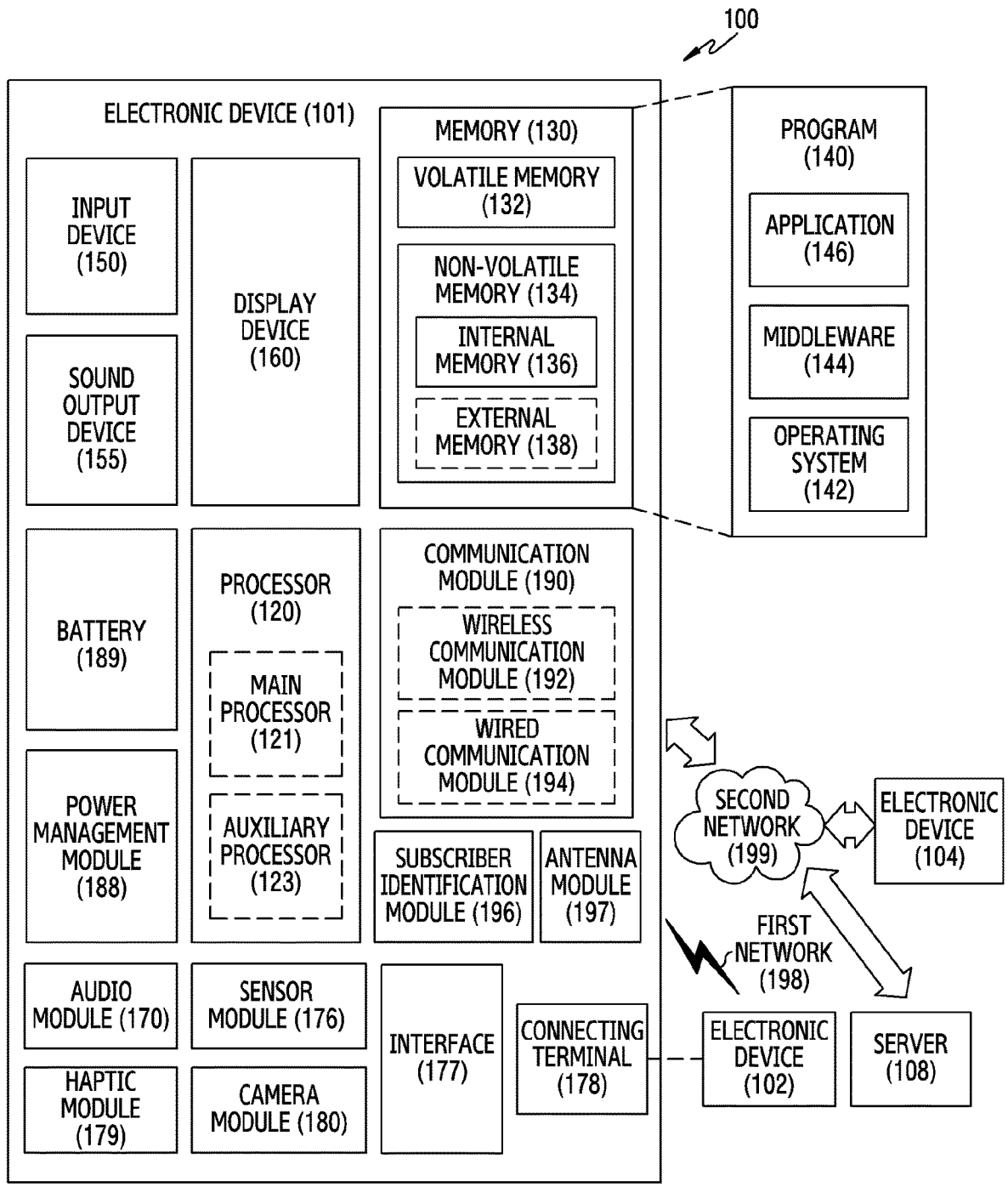
FIG. 1 illustrates a block diagram of an electronic device in a network environment according to an embodiment.

FIG. 1 illustrates a block diagram of an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to embodiments, an electronic device 102 and an electronic device 104 may be connected to a near field communication (for example, NFC) without using a communication network such as a first network 198 or a second network 199.

Figure 2:
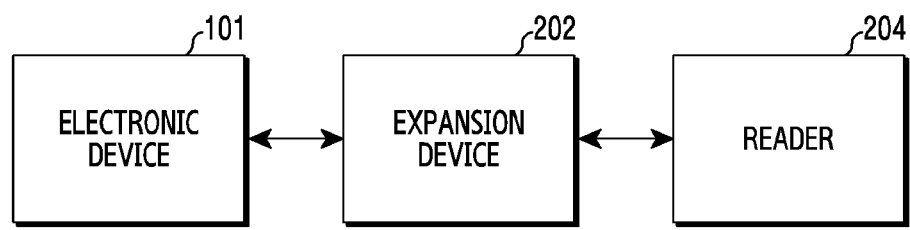
FIG. 2 illustrates a schematic diagram of a method for expanding a wireless communication, according to an embodiment.

FIG. 2 illustrates a schematic diagram of a method for expanding a wireless communication, according to various embodiments. Referring to FIG. 2, the electronic device 101 (for example, the electronic device 101 of FIG. 1) according to various embodiments transmits a signal to or receives a signal from an expansion device 202 (for example, the electronic device 102 of FIG. 1) via a second radio access technology (RAT), and the expansion device 202 transmits a signal to or receives a signal from a reader 204 (for example, the electronic device 104 of FIG. 1) via a first RAT. The expansion device 202 may transmit a signal to or receive a signal from the electronic device 101 via the second RAT, the signal being transmitted or received via the first RAT between the electronic device 101 and the reader 204. The first RAT may be a near field communication (for example, NFC), and the second RAT may be an ultra-wide band (for example, UWB) communication.

Figure 3:
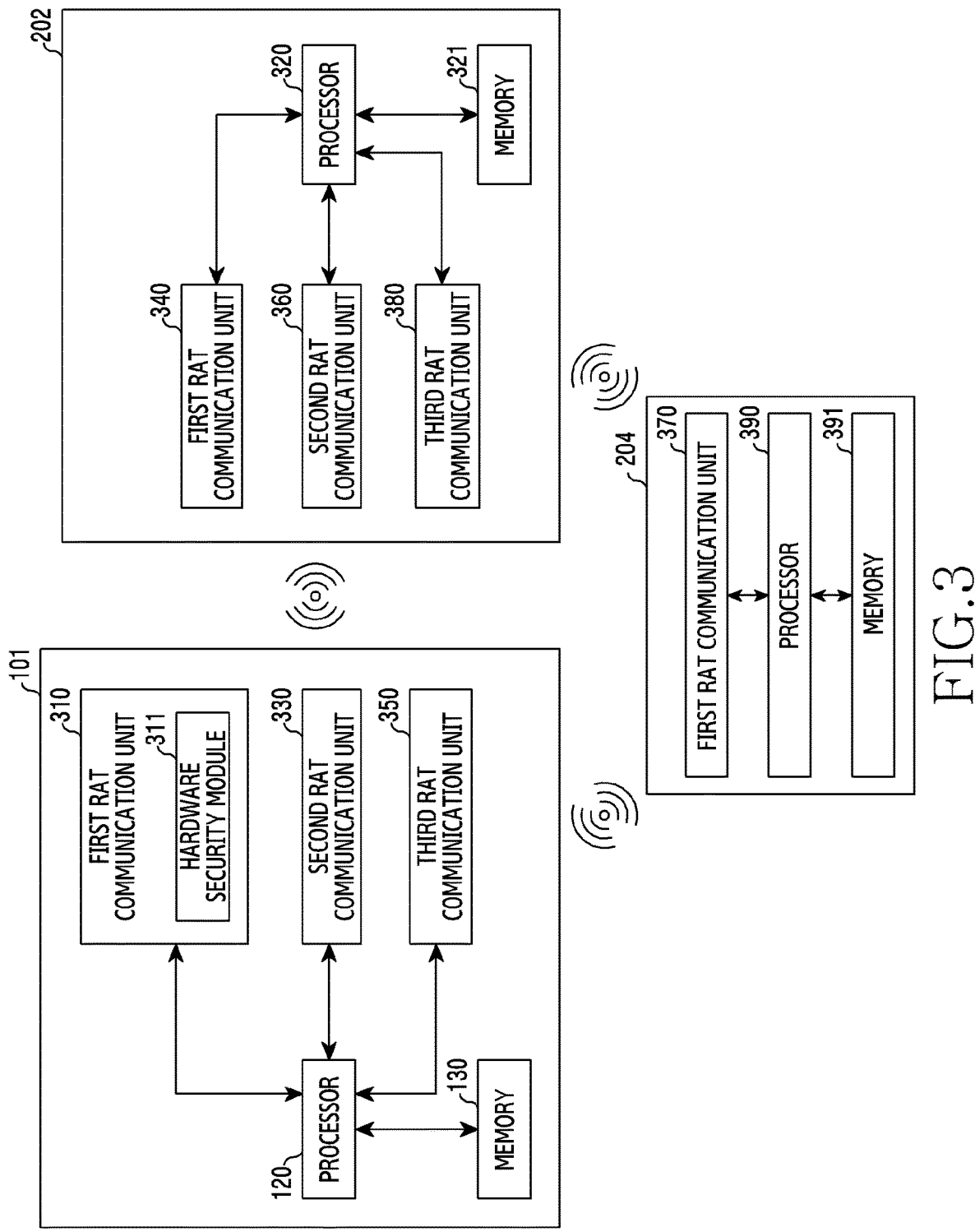
FIG. 3 illustrates a block diagram of an electronic device and a device expanding a wireless communication, according to an embodiment.

FIG. 3 illustrates a block diagram of the electronic device 101 and the expansion device 202 expanding a wireless communication, according to various embodiments. The electronic device 101 and the expansion device 202 according to various embodiments may transmit or receive a signal via the first RAT.

Referring to FIG. 3, the electronic device 101 may include a processor 120, a memory 130, a first RAT communication unit 310, a second RAT communication unit 330, or a third RAT communication unit 350.

The processor 120 controls the entire operation of the electronic device 101. For example, the processor 120 may control at least one of other elements (for example, elements of hardware or software) of the electronic device 101 connected to the processor 120, and perform various data processing or arithmetic operations. According to one embodiment, as at least a part of the data processing or arithmetic operations, the processor 120 may enable a command or data received from another element to be loaded on the memory 130, process the command or data stored in the memory 130, and store result data in the memory 130.

The memory 130 may store various data which is used by at least one element of the electronic device 101. For example, the data may include software, and input data or output data, which relates to a command related to the software.

The first RAT communication unit 310 may transmit a signal to or receive a signal from the reader 204 via the first RAT. The first RAT may be an RAT suitable for a near field communication such as NFC. The first RAT communication unit 310 may include a hardware security module 311. The hardware security module 311 stores information required for a communication which is performed via the first RAT. Such information may include identification information and encoded data of the electronic device 101. The first RAT communication unit 310 may include an antenna (for example, a coil, not shown) for transmitting or receiving a signal via the first RAT.

The second RAT communication unit 330 may transmit a signal to or receive a signal from the expansion device 202 via the second RAT. The second RAT communication unit 330 may be an RAT using a wide frequency band, such as an UWB communication. The second RAT communication unit 330 may transmit or receive a signal which is transmitted or received via the first RAT. The second RAT communication unit 330 may include an antenna (not shown) for transmitting or receiving a signal via the second RAT, and a switch (not shown) for tuning on or off such antenna. According to various embodiments, the second RAT communication unit 330 may be used to determine a distance between the electronic device 101 and the expansion device 202. According to various embodiments, the second RAT communication unit 330 may transmit or receive a signal for initiating a second RAT communication between the electronic device 101 and the expansion device 202.

The third RAT communication unit 350 may transmit a signal to or receive a signal from the expansion device 202 via a third RAT. The third RAT communication unit 350 may be an RAT, which transmits or receives a signal by using low power, such as Bluetooth low energy (BLE). The third RAT communication unit 350 may transmit or receive a signal which is transmitted or received via the third RAT. The third RAT communication unit 350 may include an antenna (not shown) for transmitting or receiving a signal via the third RAT. According to various embodiments, the third RAT communication unit 350 may transmit or receive a signal for initiating the second RAT communication between the electronic device 101 and the expansion device 202.

In addition, the expansion device 202 may include a processor 320, a memory 321, a first RAT communication unit 340, a second RAT communication unit 360, or a third RAT communication unit 380.

The processor 320 controls the entire operation of the expansion device 202. For example, the processor 320 may control at least one of other elements (for example, elements of hardware or software) of the expansion device 202 connected to the processor 320, and perform various data processing or arithmetic operations. According to one embodiment, as at least a part of the data processing or arithmetic operations, the processor 320 may enable a command or data received from another element to be loaded on the memory 321, process the command or data stored in the memory 321, and store result data in the memory 321. According to various embodiments, the processor 320 may determine a distance between the electronic device 101 and the expansion device 202, and perform control to determine, among multiple electronic devices, an electronic device suitable for the second RAT communication.

The memory 321 may store various data which is used by at least one element of the expansion device 202. For example, the data may include software, and input data or output data, which relates to a command related to the software.

The first RAT communication unit 340 may transmit a signal to or receive a signal from the reader 204 via the first RAT. The first RAT may be an RAT suitable for a near field communication such as NFC. Such signal may include identification information and encoded data of the electronic device 101. The first RAT communication unit 340 may include an antenna (for example, a coil, not shown) for transmitting or receiving a signal via the first RAT.

The second RAT communication unit 360 may transmit a signal to or receive a signal from the electronic device 101 via the second RAT. The second RAT communication unit 360 may be an RAT using a wide frequency band, such as an UWB communication. The second RAT communication unit 360 may transmit or receive a signal which is transmitted or received via the first RAT. The second RAT communication unit 360 may include an antenna (not shown) for transmitting or receiving a signal via the second RAT, and a switch (not shown) for tuning on or off such antenna. According to various embodiments, the second RAT communication unit 360 may be used to determine a distance between the electronic device 101 and the expansion device 202. According to various embodiments, the second RAT communication unit 360 may transmit or receive a signal for initiating the second RAT communication between the electronic device 101 and the expansion device 202.

The third RAT communication unit 380 may transmit a signal to or receive a signal from the electronic device 101 via the third RAT. The third RAT communication unit 380 may be an RAT, which transmits or receives a signal by using low power, such as Bluetooth low energy (BLE). The third RAT communication unit 380 may transmit or receive a signal which is transmitted or received via the third RAT. The third RAT communication unit 380 may include an antenna (not shown) for transmitting or receiving a signal via the third RAT. According to various embodiments, the third RAT communication unit 380 may transmit or receive a signal for initiating the second RAT communication between the electronic device 101 and the expansion device 202.

The reader 204 may include a first RAT communication unit 370, a processor 390, or a memory 391.

The processor 390 controls the entire operation of the reader 204. For example, the processor 390 may control at least one of other elements (for example, elements of hardware or software) of the reader 204 connected to the processor 390, and perform various data processing or arithmetic operations. According to one embodiment, as at least a part of the data processing or arithmetic operations, the processor 390 may enable a command or data received from another element to be loaded on the memory 391, process the command or data stored in the memory 391, and store result data in the memory 391.

The memory 391 may store various data which is used by at least one element of the reader 204. For example, the data may include software, and input data or output data, which relates to a command related to the software.

The first RAT communication unit 370 may transmit a signal to or receive a signal from the expansion device 202 via the first RAT. The first RAT may be an RAT suitable for a near field communication such as NFC. Such signal may include identification information and encoded data of the electronic device 101. The first RAT communication unit 370 may include an antenna (for example, a coil, not shown) for transmitting or receiving a signal via the first RAT.

According to an embodiment, a first electronic device (for example, the electronic device 102 or the expansion device 202) for expanding a wireless communication may include: a first RAT communication unit 340 which transmits a signal to or receives a signal from a reader (for example, the electronic device 104 or the reader 204) via a first radio access technology (RAT); a second RAT communication unit 360 which transmits a signal to or receives a signal from at least one second electronic device (for example, the electronic device 101) via a second RAT; and a processor 320 which transmits, to the at least one second electronic device 101, a message requesting to initiate a communication using the second RAT and performs control such that a communication using the first RAT between the at least one second electronic device 101 and the reader 104 or 204 is performed by using the second RAT.

According to an embodiment, the first electronic device 102 or 202 may further include a third RAT communication unit 380 for transmitting a signal to or receiving a signal from the at least one second electronic device 101 via a third RAT, and the processor 320 may perform control to transmit, to the at least one second electronic device 101, a message requesting to initiate a communication using the second RAT via a communication using the third RAT.

According to an embodiment, in the first electronic device 102 or 202, the processor 320 may perform control to transmit a message for waking up the at least one second electronic device 101.

According to an embodiment, in the first electronic device 102 or 202, the processor 320 receives the message of initiating a communication using the second RAT from the at least one second electronic device 101, and may thus perform control to enable transition to a state where a communication using the second RAT with the at least one second electronic device 101 is possible.

According to an embodiment, in the first electronic device 102 or 202, the processor 320 may determine a distance therefrom to the at least one second electronic device 101, and, when the determined distance therefrom to the at least one second electronic device 101 is shorter than a predetermined first distance, may perform control to enable transition to a state where a communication using the second RAT with the at least one second electronic device 101 is possible.

According to an embodiment, in the first electronic device 102 or 202, the processor 320 transmits, to the at least one second electronic device 101, a message for identifying a distance and receives, from the at least one second electronic device 101, a response message to the message for identifying a distance, and may thus perform control to determine a distance therefrom to the at least one second electronic device 101, based on a transmission time of the message for identifying a distance and a reception time of the response message.

According to an embodiment, in the first electronic device 102 or 202, the processor 320 may determine a distance therefrom to the at least one second electronic device 101, and, when the determined distance therefrom to the at least one second electronic device 101 is shorter than a predetermined second distance, may perform control such that a communication using the first RAT between the at least one second electronic device 101 and the reader 104 or 204 is performed by using the second RAT. For example, the first electronic device 102 or 202 transmits data related to the first RAT to or receives the same from the second electronic device 101 via the second RAT, and may thus perform a communication using the first RAT with the reader 104 or 204.

According to an embodiment, in the first electronic device 102 or 202, the processor 320 transmits a message for a starting time to the at least one second electronic device 101 via the second RAT, and receives, from the at least one second electronic device 101, a message for a return time via the second RAT, and may thus perform control to determine a distance therefrom to the at least one second electronic device 101, based on a transmission time of the message for a starting time and a reception time of the message for a return time.

According to an embodiment, in the first electronic device 102 or 202, the processor 320 may acquire, from the at least one second electronic device 101, identification information of the at least one second electronic device 101 via a communication using the second RAT, and perform control such that the acquired identification information of the at least one second electronic device 101 is transmitted to the reader 104 or 204 via a communication using the first RAT.

According to an embodiment, when the at least one second electronic device 101 detects an input for personal authentication, and is thus switched to be in a state where the second RAT can be used thereby, in the first electronic device 102 or 202, the processor 320 may perform control to transmit, to the at least one second electronic device 101, a message for triggering the at least one second electronic device 101.

According to an embodiment, a second electronic device 101 may include: a first RAT communication unit 310 which transmits a signal to or receives a signal from a reader 104 or 204 via a first radio access technology (RAT); a second RAT communication unit 330 which transmits a signal to or receives a signal from a first electronic device 102 or 202 via a second RAT; and a processor 120 which receives, from the first electronic device 102 or 202, a message requesting to initiate a communication using the second RAT, and performs control such that a communication using the first RAT with the reader 104 or 204 is performed via the first electronic device 102 or 202, by using the second RAT.

According to an embodiment, the second electronic device 101 may further include a third RAT communication unit 350 for transmitting a signal to or receiving a signal from the first electronic device 102 or 202 via a third RAT, and the processor 120 may perform control to receive, from the first electronic device 102 or 202, a message requesting to initiate a communication using the second RAT via a communication using the third RAT.

According to an embodiment, in the second electronic device 101, the processor 120 receives, from the first electronic device 102 or 202, a message for waking up the second electronic device 101, and may thus perform control to wake up the second electronic device 101.

According to an embodiment, in the second electronic device 101, the processor 120 receives a message requesting to initiate a communication using the second RAT from the first electronic device 102 or 202, and may thus perform control to enable transition to a state where a communication using the second RAT with the first electronic device 102 or 202 is possible.

According to an embodiment, in the second electronic device 101, the processor 120 may perform control to receive, from the first electronic device 102 or 202, a message for identifying a distance, and to transmit, to the first electronic device 102 or 202, a response message to the message for identifying a distance.

According to an embodiment, in the second electronic device 101, the processor 120 may perform control to receive, from the first electronic device 102 or 202, a message for a starting time via the second RAT, and to transmit, to the first electronic device 102 or 202, a message for a return time via the second RAT.

According to an embodiment, in the second electronic device 101, the processor 120 may perform control to receive, from the first electronic device 102 or 202, a message requesting identification information of the second electronic device 101, and to transmit, to the first electronic device 102 or 202, the identification information of the second electronic device 101 via a communication using the second RAT.

According to an embodiment, in the second electronic device 101, the processor 120 may detect an input for personal authentication, and in response to the detected input for personal authentication, perform control to enable transition to a state where a communication using the second RAT with the first electronic device 102 or 202 is possible. The input for personal authentication may include authentication by fingerprint recognition, authentication by iris recognition, and authentication by a touch input having a predetermined pattern with respect to the second electronic device 101.

Figure 4:
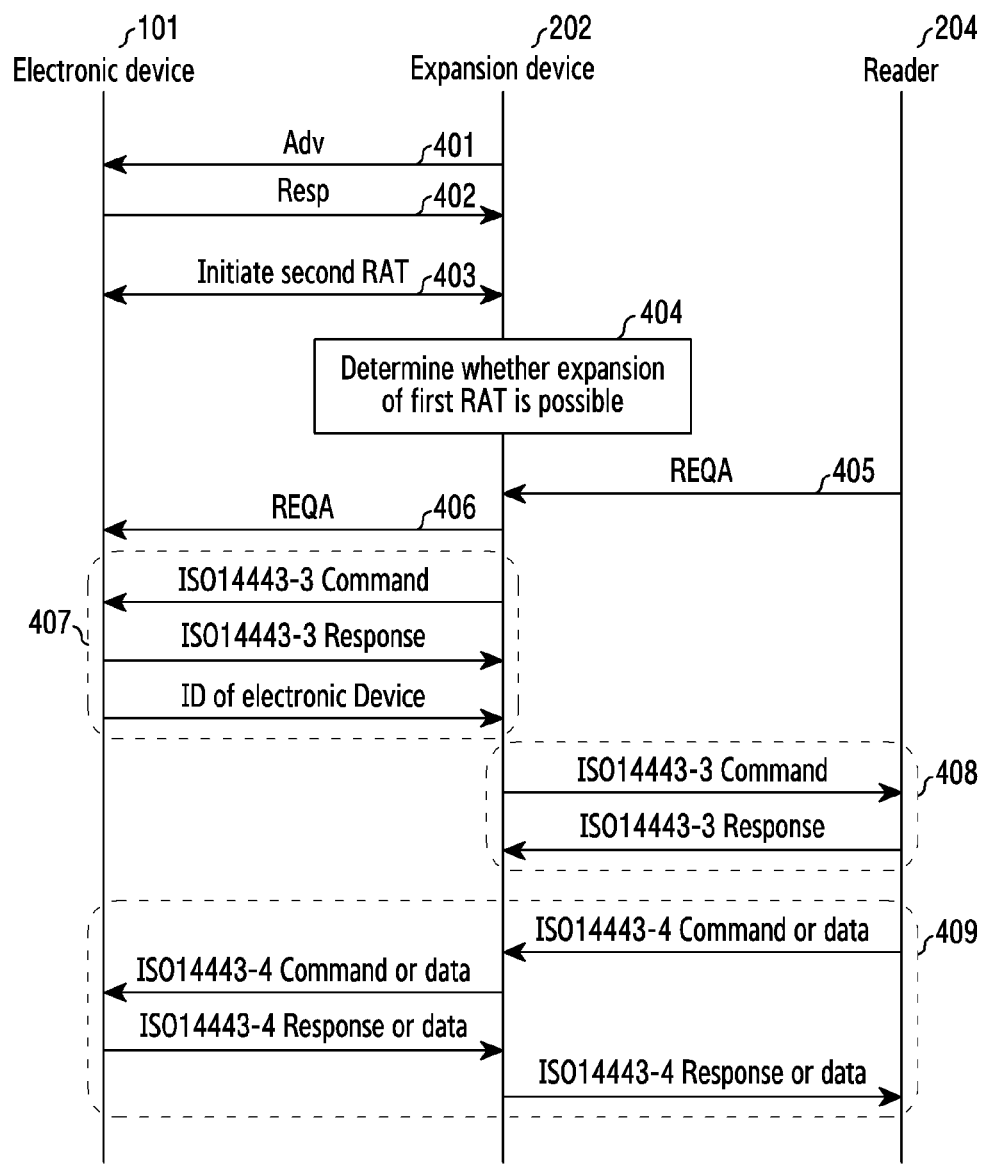
FIG. 4 illustrates a diagram of a signal exchange for expanding, via an expansion device, a wireless communication between an electronic device and a reader, according to an embodiment.
Figure 13:
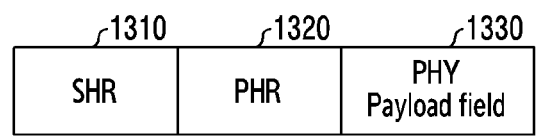
FIG. 13 illustrates a diagram of a packet which is transmitted or received via a second RAT according to an embodiment.

FIG. 4 illustrates a diagram of a signal exchange for expanding, via the expansion device 202, a wireless communication between the electronic device 101 and the reader 204, according to an embodiment. FIG. 13 illustrates a diagram of a packet which is transmitted or received via the second RAT according to an embodiment. A flowchart 400 of FIG. 4 illustrates the entire signal exchange for performing the same procedure as FIG. 2.

Referring to FIG. 4, in operation 401, the expansion device 202 transmits an Adv message to the electronic device 101. The Adv message may include information which can wake up the electronic device 101. According to an embodiment, the Adv message may be transmitted via the second RAT or the third RAT. For example, the third RAT may be BLE.

In operation 402, the electronic device 101 receives the Adv message so as to be woken up, and transmits a Resp message to the expansion device 202 in response to the wake-up. According to an embodiment, the Resp message may be transmitted via the second RAT or the third RAT.

In operation 403, the electronic device 101 and the expansion device 202 are switched to be in a state where a signal can be transmitted or received thereby via the second RAT. According to an embodiment, the expansion device 202 determines whether a distance therefrom to the electronic device 101 is within a predetermined distance, and when the distance therefrom to the electronic device 101 is within the predetermined distance, the electronic device 101 and the expansion device 202 are switched to be in a state where a signal can be transmitted or received thereby via the second RAT. For example, the expansion device 202 transmits, to the electronic device 101, a signal capable of identifying a distance, and receives, from the electronic device 101, the signal capable of identifying a distance. The signal capable of identifying a distance may be periodically (for example, a cycle of 1 sec) transmitted. The expansion device 202 may compare a transmission time and a reception time of the signal capable of identifying a distance so as to determine a distance therefrom to the electronic device 101. When the distance therefrom to the electronic device 101 is within the predetermined distance (for example, 30 m), the expansion device 202 may be switched to be in a state where a signal can be transmitted or received thereby via the second RAT.

In operation 404, the expansion device 202 determines whether the first RAT of the electronic device 101 is expandable. In other words, the expansion device 202 determines whether the distance between the electronic device 101 and the expansion device 202 is within a distance enabling the first RAT of the electronic device 101 to be expanded via the second RAT. According to an embodiment, a process of determining, by the expansion device 202, the expansion of the first RAT may include a process of determining whether the electronic device 101 is positioned within a predetermined distance. For example, the expansion device 202 transmits a message for a starting time to the electronic device 101 via the second RAT, and the electronic device 101 transmits a message for a return time to the expansion device 202 via the second RAT, so that a distance between the electronic device 101 and the expansion device 202 is determined by a time difference between the two messages. The message for a starting time may be periodically (for example, a cycle of 30 msecs) transmitted, and the expansion device 202 determines whether the determined distance between the electronic device 101 and the expansion device 202 is within a predetermined distance (for example, 2 m). When the distance between the electronic device 101 and the expansion device 202 is within the predetermined distance, the expansion device 202 expands the first RAT of the electronic device 101 to the second RAT. For example, in order to expand the first RAT of the electronic device 101 to the second RAT, the expansion device 202 may insert data related to the first RAT of the electronic device 101 into a packet which is transmitted or received via the second RAT. Referring to FIG. 13, the packet which is transmitted or received via the second RAT may include a synchronization header (SHR) 1310, a physical header (PHR) 1320, or a physical (PHY) payload field 1330. The SHR 1310 may be configured by a preamble and a start-of-frame delimiter (SFD). A starting point of the PHR 1320 may be announced via the SFD in the SHR 1310, and may be used for frame timing. The PHR 1320 may include information required for decoding of the packet. The PHY payload field 1330 may include data (for example, an NFC command) related to the first RAT of the electronic device 101. That is, as the PHY payload field 1330 in the packet which is transmitted or received via the second RAT includes data related to the first RAT, the first RAT of the electronic device 101 may be expanded via the second RAT. Hereinafter, messages of operations 406 to 408, which correspond to an ISO14443-3 command message and an ISO14443-3 response message, may be inserted into a packet of the second RAT to be transmitted or received. In addition, messages or data of operation 409, which correspond to an ISO14443-4 command message or data and an ISO14443-4 response message or data, may be inserted into the packet of the second RAT to be transmitted or received.

In operation 405, the reader 204 transmits a request command type a (REQA) message to the expansion device 202. The REQA message may include information on a type of the reader 204, and according to an embodiment, the type of the reader 204 is not limited.

In operation 406, the expansion device 202 transmits the REQA message to the electronic device 101. The electronic device 101 may transmit an answer to request type a (ATQA) message to the expansion device 202 in response to the REQA message.

In operation 407, the expansion device 202 acquires identification information of the electronic device 101 via the electronic device 101 and the second RAT. According to an embodiment, the expansion device 202 may perform the process of ISO14443-3 (for example, initialization, collision prevention, or communication initial setup) via the second RAT, with the electronic device 101. For example, the expansion device 202 may transmit, to the electronic device 101, an anti-collision message and a SELECT message via the second RAT, and the electronic device 101 may transmit an ACK message to the expansion device 202 via the second RAT in response to the SELECT message. The expansion device 202 may transmit, to the electronic device 101, a request for answer to select (RATS) message via the second RAT in response to the ACK message, and the electronic device 101 may transmit an answer to select (ATS) message to the expansion device 101 via the second RAT. The expansion device 202 may transmit, to the electronic device 101, a protocol parameter selection (PPS) message via the second RAT in response to the ATS message, and the electronic device 101 may transmit, to the expansion device 202, a message including identification information of the electronic device 101 via the second RAT in response to the PPS message.

In operation 408, the expansion device 202 transmits, to the reader 204, the identification information of the electronic device 101 via the first RAT. According to an embodiment, the expansion device 202 may perform the communication process of ISO14443-3 (for example, initialization, collision prevention, or communication initial setup) via the first RAT, with the reader 204. For example, the reader 204 may transmit, to the expansion device 202, an anti-collision message and a SELECT message via the first RAT, and the expansion device 202 may transmit an ACK message to the reader 204 via the first RAT in response to the SELECT message. The reader 204 may transmit, to the expansion device 202, an RATS message via the first RAT in response to the ACK message, and the expansion device 202 may transmit an ATS message to the reader 204 via the first RAT. The reader 204 may transmit, to the expansion device 202, a PPS message via the first RAT in response to the ATS message, and the expansion device 202 may transmit, to the reader 204, a message including identification information of a terminal via the first RAT in response to the PPS message.

In operation 409, the expansion device 202 uses the second RAT to perform the communication process for which the first RAT is used between the electronic device 101 and the reader 204. According to an embodiment, the expansion device 202 performs the communication process of ISO14443-4 (for example, exchange of data or encoded data) via the second RAT, with the electronic device 101, and in response to this, may perform the communication process of ISO14443-4 via the first RAT, with the reader 204. For example, the expansion device 202 receives, from the reader 204, a command message or data via the first RAT, and in response to this, may transmit, to the electronic device 101, the received command message or data via the second RAT. In addition, the expansion device 202 receives, from the electronic device 101, a response message or data via the second RAT, and in response to this, may transmit, to the reader 204, the received response message or data via the first RAT.

According to another embodiment, in operations 401 and 402, the electronic device 101, not the expansion device 202, may transmit an Adv message to the expansion device 202. The expansion device 202 may receive, from the electronic device 101, the Adv message so as to be woken up, and transmit a Resp message to the electronic device 101 in response to the wake-up. For example, the Adv message or the Resp message may be transmitted via the second RAT or the third RAT.

Figure 5:
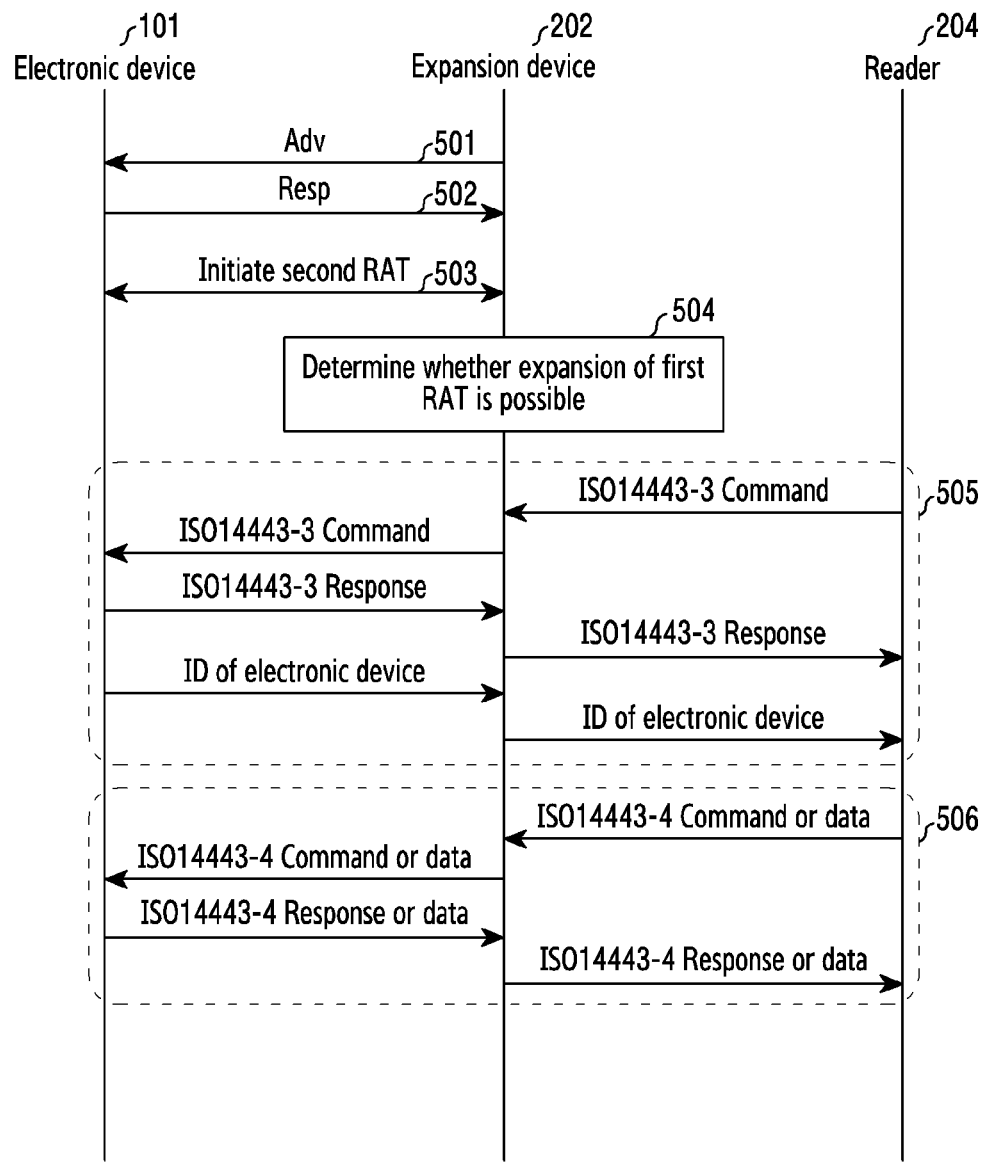
FIG. 5 illustrates a diagram of a signal exchange for expanding, via an expansion device, a wireless communication between an electronic device and a reader, according to an embodiment.

FIG. 5 illustrates a diagram of a signal exchange for expanding, via the expansion device 202, a wireless communication between the electronic device 101 and the reader 204, according to an embodiment.

Referring to FIG. 5, in operation 501, the expansion device 202 transmits an Adv message to the electronic device 101. The Adv message may include information which can wake up the electronic device 101. According to an embodiment, the Adv message may be transmitted via the second RAT or the third RAT.

In operation 502, the electronic device 101 receives the Adv message so as to be woken up, and transmits a Resp message to the expansion device 202 in response to the wake-up. According to an embodiment, the Resp message may be transmitted via the second RAT or the third RAT.

In operation 503, the electronic device 101 and the expansion device 202 are switched to be in a state where a signal can be transmitted or received thereby via the second RAT. According to an embodiment, the expansion device 202 determines whether a distance therefrom to the electronic device 101 is within a predetermined distance, and when the distance therefrom to the electronic device 101 is within the predetermined distance, the electronic device 101 and the expansion device 202 are switched to be in a state where a signal can be transmitted or received thereby via the second RAT. For example, the expansion device 202 transmits, to the electronic device 101, a signal capable of identifying a distance, and receives, from the electronic device 101, the signal capable of identifying a distance. The signal capable of identifying a distance may be periodically (for example, a cycle of 1 sec) transmitted. The expansion device 202 may compare a transmission time and a reception time of the signal capable of identifying a distance so as to determine a distance therefrom to the electronic device 101. When the distance therefrom to the electronic device 101 is within a predetermined distance (for example, 30 m), the expansion device 202 may be switched to be in a state where a signal can be transmitted or received thereby via the second RAT.

In operation 504, the expansion device 202 determines whether the first RAT of the electronic device 101 is expandable. In other words, the expansion device 202 determines whether the distance between the electronic device 101 and the expansion device 202 is within a distance enabling the first RAT of the electronic device 101 to be expanded via the second RAT. According to an embodiment, a process of determining, by the expansion device 202, the expansion of the first RAT may include a process of determining whether the electronic device 101 is positioned within a predetermined distance. For example, the expansion device 202 transmits a message for a starting time to the electronic device 101 via the second RAT, and the electronic device 101 transmits a message for a return time to the expansion device 202 via the second RAT, so that a distance between the electronic device 101 and the expansion device 202 is determined by a time difference between the two messages. The message for a starting time may be periodically (for example, a cycle of 30 msecs) transmitted, and the expansion device 202 determines whether the determined distance between the electronic device 101 and the expansion device 202 is within a predetermined distance (for example, 2 m). When the distance between the electronic device 101 and the expansion device 202 is within a predetermined distance, the expansion device 202 expands the first RAT of the electronic device 101 to the second RAT.

Hereinafter, messages of operation 505, which correspond to an ISO14443-3 command message and an ISO14443-3 response message, may be inserted into a packet of the second RAT to be transmitted or received. In addition, messages or data of operation 506, which correspond to an ISO14443-4 command message or data and an ISO14443-4 response message or data, may be inserted into the packet of the second RAT to be transmitted or received.

In operation 505, the expansion device 202 performs via the second RAT to allow the reader 204 to acquire identification information of the electronic device 101. According to an embodiment, the expansion device 202 performs the communication process of ISO14443-3 (for example, initialization, collision prevention, or communication initial setup) via the second RAT, with the electronic device 101, and in response to this, may perform the communication process of ISO14443-3 via the first RAT, with the reader 204. For example, the expansion device 202 receives, from the reader 204, a command message via the first RAT, and in response to this, may transmit, to the electronic device 101, the received command message via the second RAT. In addition, the expansion device 202 receives, from the electronic device 101, a response message via the second RAT, and in response to this, may transmit, to the reader 204, the received response message via the first RAT. In addition, the electronic device 101 may transmit, to the expansion device 202, identification information of the electronic device 101 via the second RAT, and upon receiving the identification information of the electronic device 101, the expansion device 202 may transmit, to the reader 204, the identification information of the electronic device 101.

In operation 506, the expansion device 202 uses the second RAT to perform the communication process for which the first RAT is used between the electronic device 101 and the reader 204. According to an embodiment, the expansion device 202 performs the communication process of ISO14443-4 (for example, exchange of data or encoded data) via the second RAT, with the electronic device 101, and in response to this, may perform the communication process of ISO14443-4 via the first RAT, with the reader 204. For example, the expansion device 202 receives, from the reader 204, a command message or data via the first RAT, and in response to this, may transmit, to the electronic device 101, the received command message or data via the second RAT. In addition, the expansion device 202 receives, from the electronic device 101, a response message or data via the second RAT, and in response to this, may transmit, to the reader 204, the received response message or data via the first RAT.

According to another embodiment, in operations 501 and 502, the electronic device 101, not the expansion device 202, may transmit an Adv message to the expansion device 202. The expansion device 202 may receive, from the electronic device 101, the Adv message so as to be woken up, and transmit a Resp message to the electronic device 101 in response to the wake-up. For example, the Adv message or the Resp message may be transmitted via the second RAT or the third RAT.

Figure 6:
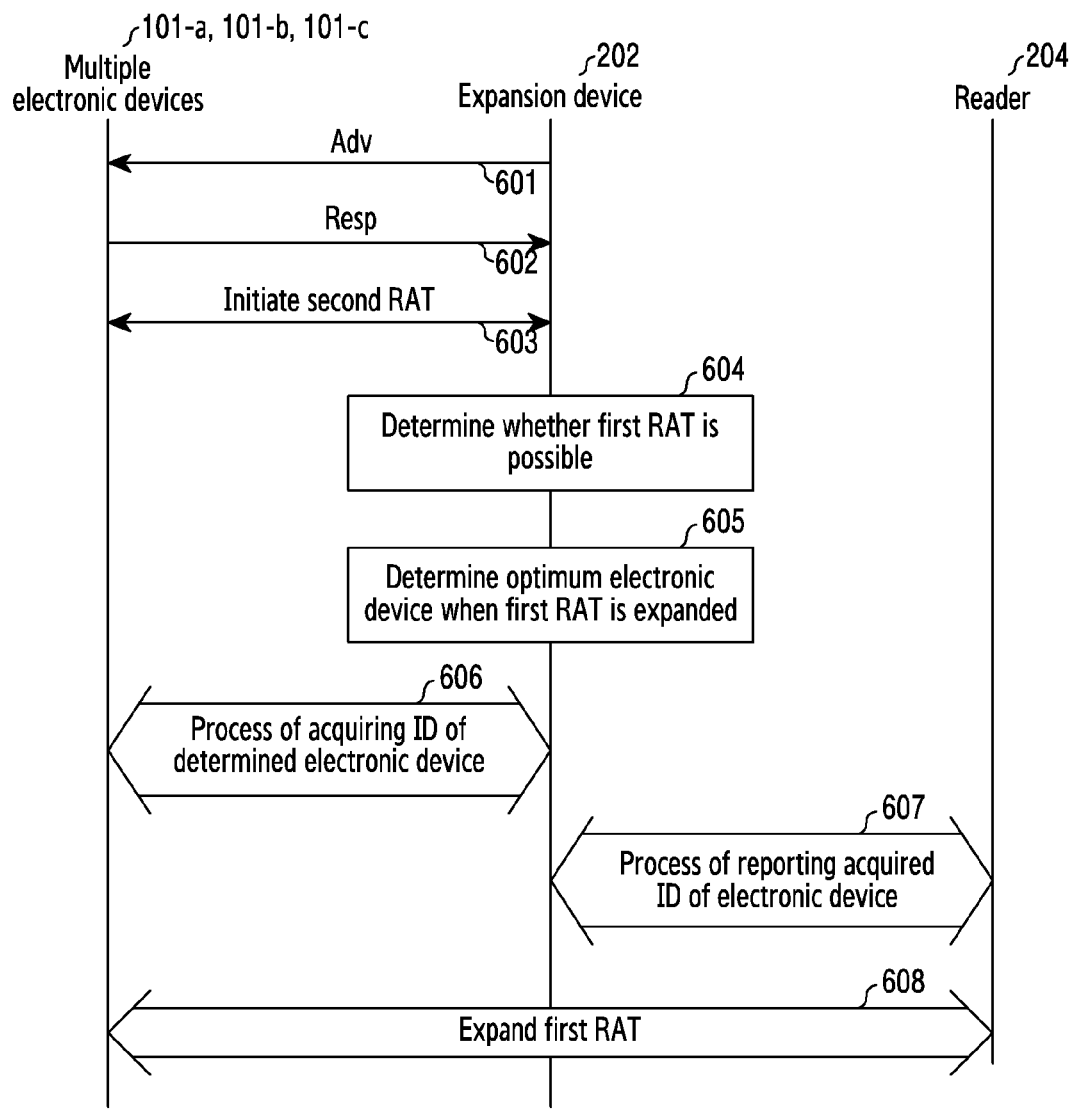
FIG. 6 illustrates a diagram of a signal exchange for expanding, via an expansion device, a wireless communication between multiple electronic devices and a reader, according to an embodiment.

FIG. 6 illustrates a diagram of a signal exchange for expanding, via the expansion device 202, a wireless communication between multiple electronic devices 101-a, 101-b, and 101-c and the reader 204, according to an embodiment.

Referring to FIG. 6, in operation 601, the expansion device 202 transmits an Adv message to multiple electronic devices 101-a, 101-b, and 101-c. The Adv message may include information which can wake up the multiple electronic device 101-a, 101-b, and 101-c. According to an embodiment, the Adv message may be transmitted via the second RAT or the third RAT.

In operation 602, each of the multiple electronic devices 101-a, 101-b, and 101-c receives an Adv message so as to be woken up, and transmits a Resp message to the expansion device 202. According to an embodiment, the Resp message may be transmitted via the second RAT or the third RAT.

In operation 603, the multiple electronic devices 101-a, 101-b, and 101-c and the expansion device 202 are switched to be in a state where a signal can be transmitted or received thereby via the second RAT. According to an embodiment, the expansion device 202 determines whether a distance therefrom to at least one of the multiple electronic devices 101-a, 101-b, and 101-c is within a predetermined distance, and when the distance therefrom to at least one of the multiple electronic devices 101-a, 101-b, and 101-c is within the predetermined distance, the expansion device 202 and the at least one electronic device within the predetermined distance are switched to be in a state where a signal can be transmitted or received thereby via the second RAT. For example, the expansion device 202 transmits, to the multiple electronic devices 101-a, 101-b, and 101-c, signals capable of identifying a distance, and receives, from the multiple electronic devices 101-a, 101-b, and 101-c, the signals capable of identifying a distance. The signals capable of identifying a distance may be periodically (for example, a cycle of 1 sec) transmitted. The expansion device 202 may compare a transmission time and a reception time of each of the signals capable of identifying a distance, so as to determine a distance therefrom to each of the multiple electronic devices 101-a, 101-b, and 101-c. When a distance therefrom to at least one of the multiple electronic devices 101-a, 101-b, and 101-c is within a predetermined distance (for example, 30 m), the expansion device 202 and the at least one electronic device within the predetermined distance may be switched to be in a state where a signal can be transmitted or received thereby via the second RAT.

In operation 604, the expansion device 202 determines whether the first RAT of the multiple electronic devices 101-a, 101-b, and 101-c is expandable. In other words, the expansion device 202 determines whether a distance between the expansion device 202 and each of the multiple electronic devices 101-a, 101-b, and 101-c is within a distance enabling the first RAT of the multiple electronic devices 101-a, 101-b, and 101-c to be expanded via the second RAT. According to an embodiment, a process of determining, by the expansion device 202, the expansion of the first RAT may include a process of determining whether the expansion device 202 and the multiple electronic devices 101-a, 101-b, and 101-c are positioned within a predetermined distance. For example, the expansion device 202 transmits messages for a starting time to the multiple electronic devices 101-a, 101-b, and 101-c via the second RAT, and the multiple electronic devices 101-a, 101-b, and 101-c transmit messages for a return time to the expansion device 202 via the second RAT, so that a distance between the expansion device 202 and each of the multiple electronic devices 101-a, 101-b, and 101-c is determined by a time difference between the two messages. The messages for a starting time may be periodically (for example, a cycle of 30 msecs) transmitted, and the expansion device 202 determines whether the determined distance between the expansion device 202 and each of the multiple electronic devices 101-a, 101-b, and 101-c is within a predetermined distance (for example, 2 m). The expansion device 202 determines whether the determined distance between the expansion device 202 and each of the multiple electronic devices 101-a, 101-b, and 101-c is within a predetermined distance. When a distance therefrom to at least one of the multiple electronic devices 101-a, 101-b, and 101-c is within a predetermined distance, the expansion device 202 expands the first RAT of the at least one electronic device within the predetermined distance to the second RAT.

In operation 605, the expansion device 202 determines an electronic device most suitable for the expansion of the first RAT among the multiple electronic devices 101-a, 101-b, and 101-c. According to an embodiment, the expansion device 202 determines an electronic device which is positioned closest to the expansion device 202, based on the distance between the expansion device 202 and each of the multiple electronic devices 101-a, 101-b, and 101-c, which has been determined in operation 604. For example, when distances between the expansion device 202 and the multiple electronic devices 101-a, 101-b, and 101-c are determined to be 0.5 m, 1 m, and 1.5 m, respectively, the electronic device 101-a positioned within a distance of 0.5 m is determined as an electronic device most suitable for the expansion of the first RAT.

Hereinafter, messages of operations 606 and 607, which correspond to an ISO14443-3 command message and an ISO14443-3 response message, may be inserted into a packet of the second RAT to be transmitted or received. In addition, messages or data of operation 608, which correspond to an ISO14443-4 command message or data and an ISO14443-4 response message or data, may be inserted into the packet of the second RAT to be transmitted or received.

In operation 606, the expansion device 202 acquires identification information of the electronic device 101-a via a determined electronic device (for example, 101-a) and the second RAT. According to an embodiment, the expansion device 202 may perform the process of ISO14443-3 (for example, initialization, collision prevention, or communication initial setup) via the second RAT, with the electronic device 101-a. For example, the expansion device 202 may transmit, to the electronic device 101-a, an anti-collision message and a SELECT message via the second RAT, and the electronic device 101-a may transmit an ACK message to the expansion device 202 via the second RAT in response to the SELECT message. The expansion device 202 may transmit, to the electronic device 101-a, an RATS message via the second RAT in response to the ACK message, and the electronic device 101-a may transmit an ATS message to the expansion device 202 via the second RAT. The expansion device 202 may transmit, to the electronic device 101-a, a PPS message via the second RAT in response to the ATS message, and the electronic device 101-a may transmit, to the expansion device 202, a message including identification information of the electronic device 101-a via the second RAT in response to the PPS message.

In operation 607, the expansion device 202 transmits, to the reader 204, the identification information of the electronic device 101-a via the first RAT. According to an embodiment, the expansion device 202 may perform the process of ISO14443-3 (for example, initialization, collision prevention, or communication initial setup) via the first RAT, with the reader 204. For example, the reader 204 may transmit, to the expansion device 202, an anti-collision message and a SELECT message via the first RAT, and the expansion device 202 may transmit an ACK message to the reader 204 via the first RAT in response to the SELECT message. The reader 204 may transmit, to the expansion device 202, an RATS message via the first RAT in response to the ACK message, and the expansion device 202 may transmit an ATS message to the reader 204 via the first RAT. The reader 204 may transmit, to the expansion device 202, a PPS message via the first RAT in response to the ATS message, and the expansion device 202 may transmit, to the reader 204, a message including the identification information of the electronic device 101-a via the first RAT in response to the PPS message.

In operation 608, the expansion device 202 uses the second RAT to perform the communication process for which the first RAT is used between the electronic device 101-a and the reader 204. According to an embodiment, the expansion device 202 performs the communication process of ISO14443-4 (for example, exchange of data or encoded data) via the second RAT, with the electronic device 101-a, and in response to this, may perform the communication process of ISO14443-4 via the first RAT, with the reader 204. For example, the expansion device 202 receives, from the reader 204, a command message or data via the first RAT, and in response to this, may transmit, to the electronic device 101-a, the received command message or data via the second RAT. In addition, the expansion device 202 receives, from the electronic device 101-a, a response message or data via the second RAT, and in response to this, may transmit, to the reader 204, the received response message or data via the first RAT.

According to another embodiment, in operations 601 and 602, each of the multiple electronic devices 101-a, 101-b, and 101-c, not the expansion device 202, may transmit an Adv message to the expansion device 202. The expansion device 202 may receive, from one of the multiple electronic devices 101-a, 101-b, and 101-c, the Adv message so as to be woken up, and transmit a Resp message to an electronic device which transmits the Adv message, in response to the wake-up. For example, the Adv message or the Resp message may be transmitted via the second RAT or the third RAT.

Figure 7:
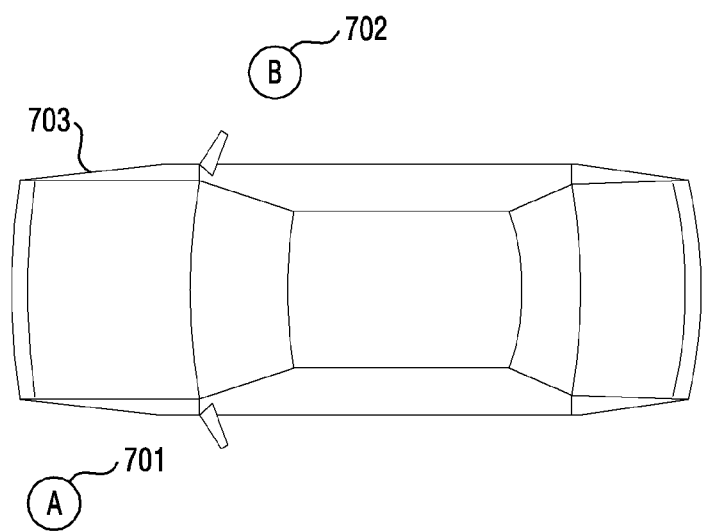
FIG. 7 illustrates a diagram of an example of expanding, via an expansion device, a wireless communication between a reader and multiple electronic devices, according to an embodiment.

FIG. 7 illustrates a diagram of an example of expanding, via an expansion device, a wireless communication between a reader and multiple electronic devices 701 and 702, according to an embodiment. According to an embodiment, the expansion device 202 and the reader 204 may be installed in a vehicle 703 of FIG. 7.

Referring to FIG. 7, the vehicle 703 (for example, the reader 204 installed inside the vehicle 703) may open a door of the vehicle 703 via the first RAT and multiple electronic devices 701 and 702, based on identification information of the multiple electronic devices 701 and 702. The vehicle 703 (for example, the expansion device 202 installed inside the vehicle 703) may perform the first RAT between the reader 204 and the multiple electronic devices 701 and 702 via the second RAT.

First, the vehicle 703 transmits, to the multiple electronic devices 701 and 702, messages for wake-up. The messages for wake-up may be transmitted via the second RAT or the third RAT.

Each of the multiple electronic devices 701 and 702 receives a message including information enabling wake-up thereof so as to be woken up, and transmits a response message to the vehicle 703. The response message may be transmitted via the second RAT or the third RAT.

The vehicle 703 determines whether a distance therefrom to each of the multiple electronic devices 701 and 702 is within a predetermined first distance. According to an embodiment, for example, the predetermined first distance may be 30 m, and when at least one of the multiple electronic devices 701 and 702 is within the predetermined first distance, the vehicle 703 and the at least one electronic device are switched to be in a state where a signal can be transmitted or received thereby via the second RAT.

The vehicle 703 determines whether the first RAT of the at least one switched electronic device is expandable via the second RAT. According to an embodiment, the vehicle 703 may periodically (for example, a cycle of 30 msecs) transmit, to the at least one electronic device, a message for a starting time via the second RAT, and receives, from the at least one electronic device, a message for a return time via the second RAT, so that a distance therefrom to the at least one electronic device is determined by a time difference between the two messages. When the determined distance therefrom to the at least one electronic device is within a predetermined second distance (for example, 2 m), the vehicle 703 expands the first RAT of the at least one electronic device within the predetermined second distance to the second RAT. According to an embodiment, when the multiple electronic devices 701 and 702 are positioned within the predetermined second distance, the vehicle 703 determines an electronic device which is positioned closest to the vehicle 703, and expands the first RAT of the determined electronic device to the second RAT.

The vehicle 703 performs a communication process with respect to the first RAT via the second RAT, with the determined electronic device. For example, the vehicle 703 acquires identification information of the determined electronic device via the second RAT, and determines whether the determined electronic device corresponds to an electronic device which is paired with the vehicle 703, based on the acquired identification information. When the determined electronic device corresponds to an electronic device which is paired with the vehicle 703, the vehicle 703 may open the door of the vehicle 703.

Figure 8:
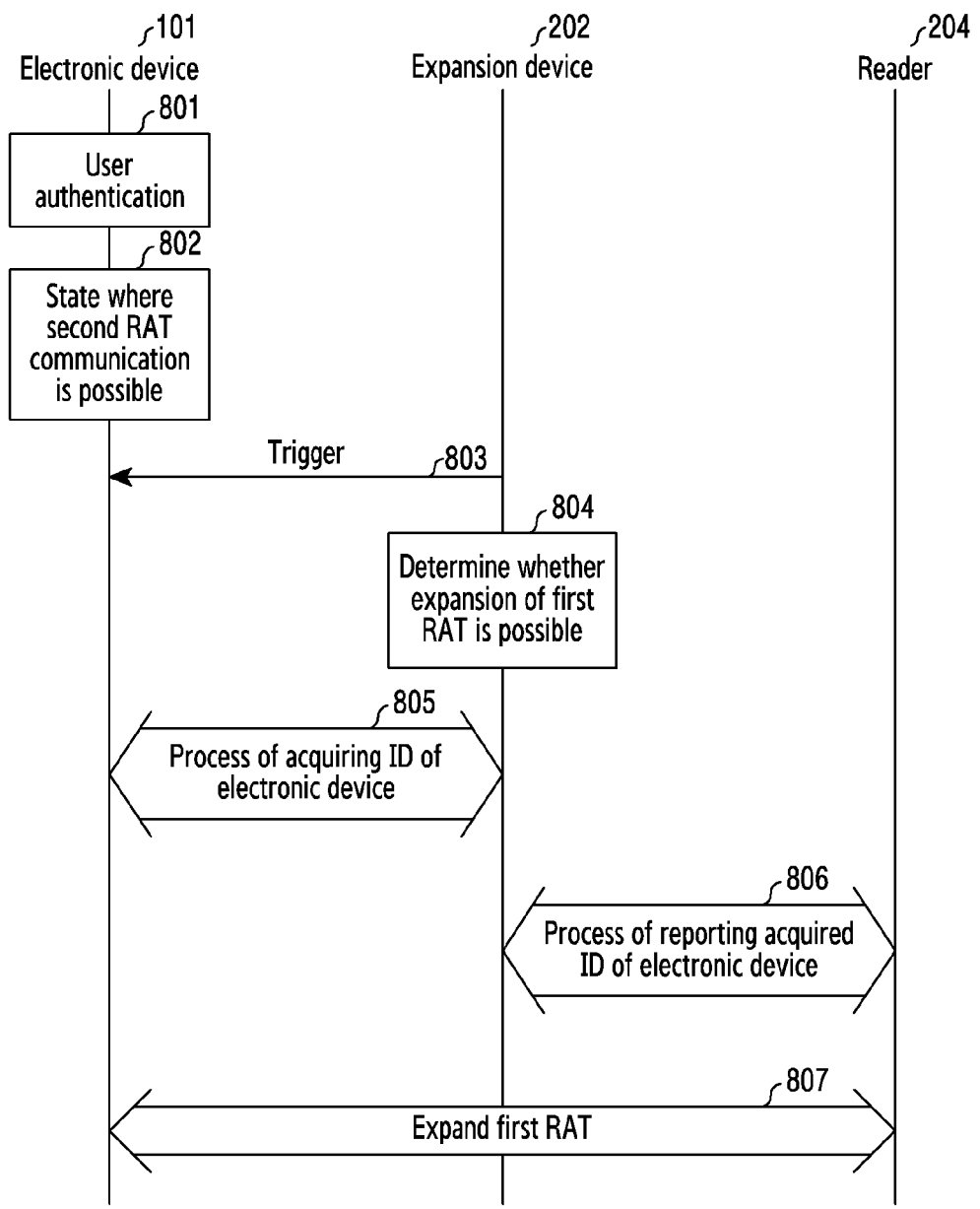
FIG. 8 illustrates a diagram of a signal exchange for expanding, via an expansion device, a wireless communication between an electronic device and a reader, according to an embodiment.

FIG. 8 illustrates a diagram of a signal exchange for expanding, via the expansion device 202, a wireless communication between the electronic device 101 and the reader 204, according to an embodiment. According to an embodiment, FIG. 8 illustrates a method of initiating, by the electronic device 101, the expansion of a wireless communication.

Referring to FIG. 8, in operation 801, personal authentication of the electronic device 101 is performed by an external input. According to an embodiment, the personal authentication may include biometric authentication (for example, authentication by fingerprint recognition or authentication by iris recognition) or authentication by a touch input having a predetermined pattern with respect to the electronic device 101.

In operation 802, the electronic device 101 is switched to be in a state where a communication via the second RAT is possible, based on the personal authentication, and in operation 803, the expansion device 202 transmits a message for triggering the electronic device 101.

In operation 804, the expansion device 202 determines whether the first RAT of the electronic device 101 is expandable. In other words, the expansion device 202 determines whether a distance between the electronic device 101 and the expansion device 202 is within a distance enabling the first RAT of the electronic device 101 to be expanded via the second RAT. According to an embodiment, a process of determining, by the expansion device 202, the expansion of the first RAT may include a process of determining whether the electronic device 101 is positioned within a predetermined distance. For example, the expansion device 202 transmits a message for a starting time to the electronic device 101 via the second RAT, and the electronic device 101 transmits a message for a return time to the expansion device 202 via the second RAT, so that a distance between the electronic device 101 and the expansion device 202 is determined by a time difference between the two messages. The message for a starting time may be periodically (for example, a cycle of 30 msecs) transmitted, and the expansion device 202 determines whether the determined distance between the electronic device 101 and the expansion device 202 is within a predetermined distance (for example, 2 m). When the distance between the electronic device 101 and the expansion device 202 is within the predetermined distance, the expansion device 202 expands the first RAT of the electronic device 101 to the second RAT.

Hereinafter, messages of operations 805 and 806, which correspond to an ISO14443-3 command message and an ISO14443-3 response message, may be inserted into a packet of the second RAT to be transmitted or received. In addition, messages or data of operation 807, which correspond to an ISO14443-4 command message or data and an ISO14443-4 response message or data, may be inserted into the packet of the second RAT to be transmitted or received.

In operation 805, the expansion device 202 acquires identification information of the electronic device 101 via the electronic device 101 and the second RAT. According to an embodiment, the expansion device 202 may perform the process of ISO14443-3 (for example, initialization, collision prevention, or communication initial setup) via the second RAT, with the electronic device 101. For example, the expansion device 202 may transmit, to the electronic device 101, an anti-collision message and a SELECT message via the second RAT, and the electronic device 101 may transmit an ACK message to the expansion device 202 via the second RAT in response to the SELECT message. The expansion device 202 may transmit, to the electronic device 101, an RATS message via the second RAT in response to the ACK message, and the electronic device 101 may transmit an ATS message to the expansion device 101 via the second RAT. The expansion device 202 may transmit, to the electronic device 101, a PPS message via the second RAT in response to the ATS message, and the electronic device 101 may transmit, to the expansion device 202, a message including identification information of the electronic device 101 via the second RAT in response to the PPS message.

In operation 806, the expansion device 202 transmits, to the reader 204, the identification information of the electronic device 101 via the first RAT. According to an embodiment, the expansion device 202 may perform the process of ISO14443-3 (for example, initialization, collision prevention, or communication initial setup) via the first RAT, with the reader 204. For example, the reader 204 may transmit, to the expansion device 202, an anti-collision message and a SELECT message via the first RAT, and the expansion device 202 may transmit an ACK message to the reader 204 via the first RAT in response to the SELECT message. The reader 204 may transmit, to the expansion device 202, an RATS message via the first RAT in response to the ACK message, and the expansion device 202 may transmit an ATS message to the reader 204 via the first RAT. The reader 204 may transmit, to the expansion device 202, a PPS message via the first RAT in response to the ATS message, and the expansion device 101 may transmit, to the reader 204, a message including the identification information of the electronic device 101 via the first RAT in response to the PPS message.

In operation 807, the expansion device 202 uses the second RAT to perform the communication process for which the first RAT is used between the electronic device 101 and the reader 204. According to an embodiment, the expansion device 202 performs the communication process of ISO14443-4 (for example, exchange of data or encoded data) via the second RAT, with the electronic device 101, and in response to this, may perform the communication process of ISO14443-4 via the first RAT, with the reader 204. For example, the expansion device 202 receives, from the reader 204, a command message or data via the first RAT, and in response to this, may transmit, to the electronic device 101, the received command message or data via the second RAT. In addition, the expansion device 202 receives, from the electronic device 101, a response message or data via the second RAT, and in response to this, may transmit, to the reader 204, the received response message or data via the first RAT.

According to another embodiment, in operation 803, the electronic device 101, not the expansion device 202, may transmit a message for triggering to the expansion device 202.

Figure 9:
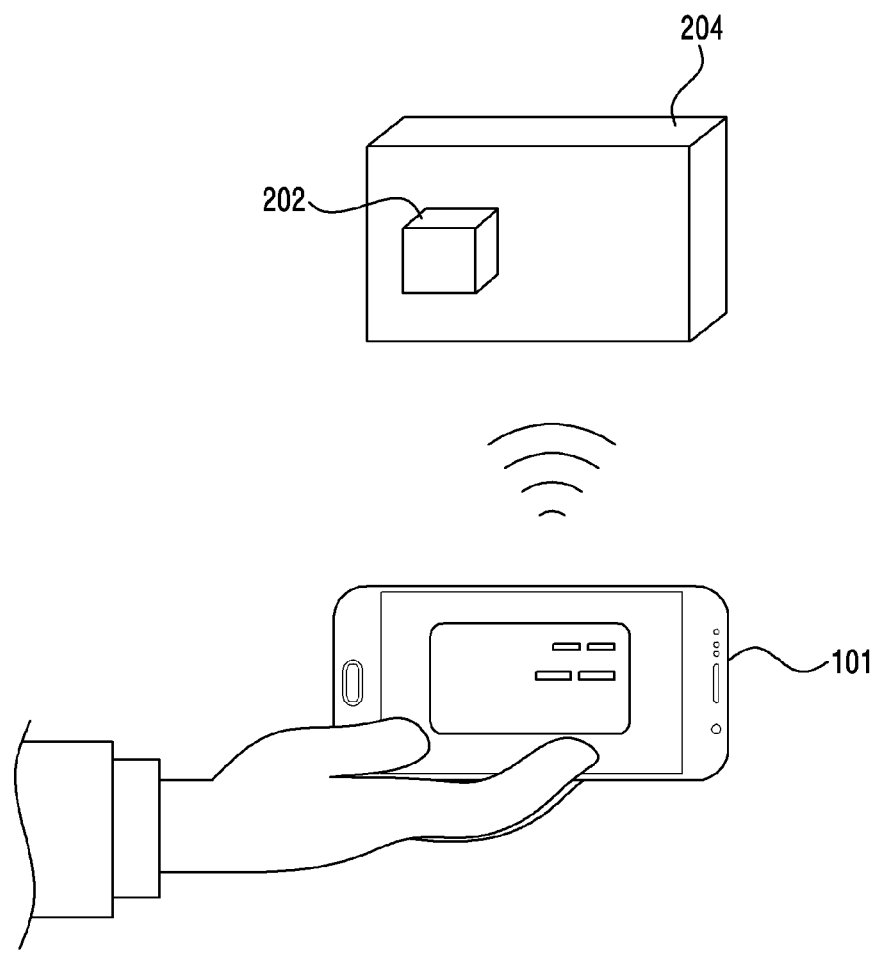
FIG. 9 illustrates a diagram of an example of expanding, via an expansion device, a wireless communication between an electronic device and a reader, according to an embodiment.

FIG. 9 illustrates a diagram of an example of expanding, via the expansion device 202, a wireless communication between the electronic device 101 and the reader 204, according to an embodiment. FIG. 9 illustrates an active tagging payment operation of an electronic device.

Referring to FIG. 9, when personal authentication is performed by an external input, the electronic device 101 is switched to be in a state where a communication via the second RAT is possible.

The expansion device 202 determines, via the second RAT, whether the electronic device 101 is within a predetermined distance. When the electronic device 101 is within the predetermined distance, the expansion device 202 expands the first RAT of the electronic device 101. The predetermined distance may be a distance ensuring security of a first RAT communication.

The electronic device 101 transmits, to the expansion device 202, identification information of the electronic device via the second RAT, and the expansion device 202 transmits, to the reader 204, the transmitted identification information of the electronic device via the first RAT.

The expansion device 202 uses the second RAT to perform the communication process (for example, a communication process related to a transaction or a communication process related to payment) for which the first RAT is used between the electronic device 101 and the reader 204.

Figure 10:
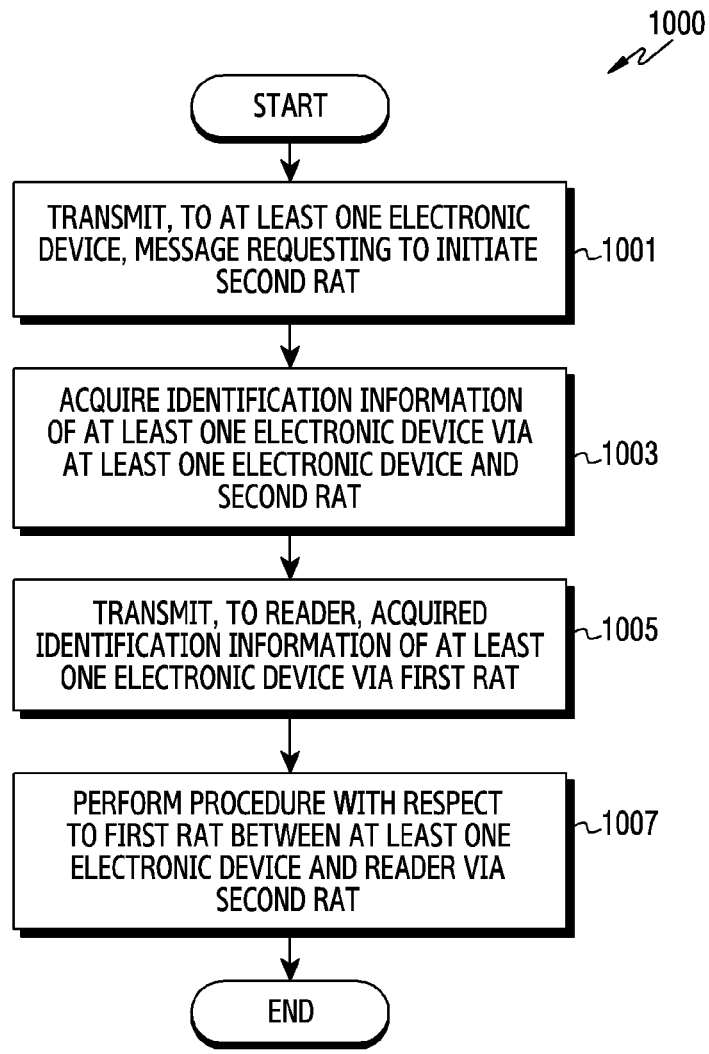
FIG. 10 illustrates a flowchart of a method of expanding, by an expansion device, a wireless communication via an expansion device, according to an embodiment.

FIG. 10 illustrates a flowchart 1000 of a method of expanding, by the electronic device 101, a wireless communication via the expansion device 202, according to an embodiment. It may be understood that an operation subject of the flowchart 1000 illustrated in FIG. 10 indicates the expansion device 202 or an element of the expansion device 202 (for example, the processor 320).

Referring to FIG. 10, in operation 1001, the expansion device 202 (for example, the processor 320) transmits a message requesting to initiate the second RAT to at least one electronic device (for example, the electronic device 101). The message requesting to initiate the second RAT may include an Adv message or a trigger message, and may be received via the second RAT or the third RAT. In addition, the expansion device 202 may transmit a message for waking up the at least one electronic device or a message for triggering the at least one electronic device. In addition, the expansion device 202 receives, from the at least one electronic device, a message of initiating a communication using the second RAT, and may thus enable transition to a state where a communication using the second RAT with the at least one electronic device is possible. In addition, the expansion device 202 transmits a message for a starting time to the at least one electronic device via the second RAT, and receives, from the at least one electronic device, a message for a return time via the second RAT, and may thus determine a distance therefrom to the at least one electronic device, based on a transmission time of the message for a starting time and a reception time of the message for a return time.

In operation 1003, the expansion device 202 acquires identification information of the at least one electronic device via the at least one electronic device and the second RAT, and in operation 1005, the expansion device 202 transmits, to the reader 204 (for example, the electronic device 104), the acquired identification information of the at least one electronic device via the first RAT.

In operation 1007, the expansion device 202 performs, via the second RAT, a procedure using the first RAT between the at least one electronic device and the reader 204. The procedure using the first RAT between the at least one electronic device and the reader 204 may include the communication process of ISO14443-3 and the communication process of ISO14443-4.

The procedure using the first RAT between the at least one electronic device and the reader 204 may include operations 1003 and 1005.

Figure 11:
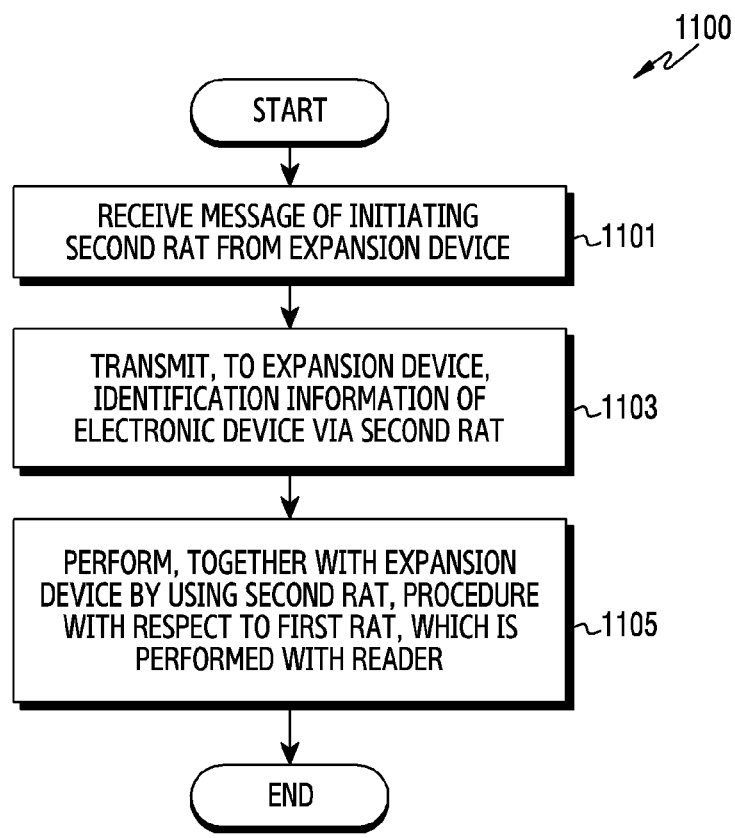
FIG. 11 illustrates a flowchart of a method of expanding, by an electronic device, a wireless communication via an expansion device, according to an embodiment.

FIG. 11 illustrates a flowchart 1100 of a method of expanding, by the electronic device 101, a wireless communication via the expansion device 202, according to an embodiment. It may be understood that an operation subject of the flowchart 1100 illustrated in FIG. 11 indicates the electronic device 101 or an element of the electronic device 101 (for example, the processor 120).

Referring to FIG. 11, in operation 1101, the electronic device 101 receives, from the expansion device 202 (for example, the electronic device 102), a message of initiating the second RAT. The message of initiating the second RAT may include an Adv message or a trigger message, and may be received via the second RAT or the third RAT. In addition, the electronic device 101 receives, from the expansion device 202, a message for waking up the electronic device 101, and may be thus woken up. In addition, the electronic device 101 receives, from the expansion device 202, a message of initiating a communication using the second RAT, and may thus enable transition to a state where a communication using the second RAT with the expansion device 202 is possible. In addition, the electronic device 101 receives, from the expansion device 202, a message for a starting time via the second RAT, and transmits, to the expansion device 202, a message for a return time via the second RAT.

In operation 1103, the electronic device 101 transmits, to the expansion device 202, identification information of the electronic device 101 via the second RAT. In operation 1105, the electronic device 101 performs, together with the expansion device 202 by using the second RAT, a procedure which the electronic device uses the first RAT to perform together with the reader 204 (for example, the electronic device 104). The procedure using the first RAT between the electronic device 101 and the reader 204 may include the communication process of ISO14443-3 and the communication process of ISO14443-4.

The procedure using the first RAT between the electronic device 101 and the reader 204 may include operation 1103.

Figure 12:
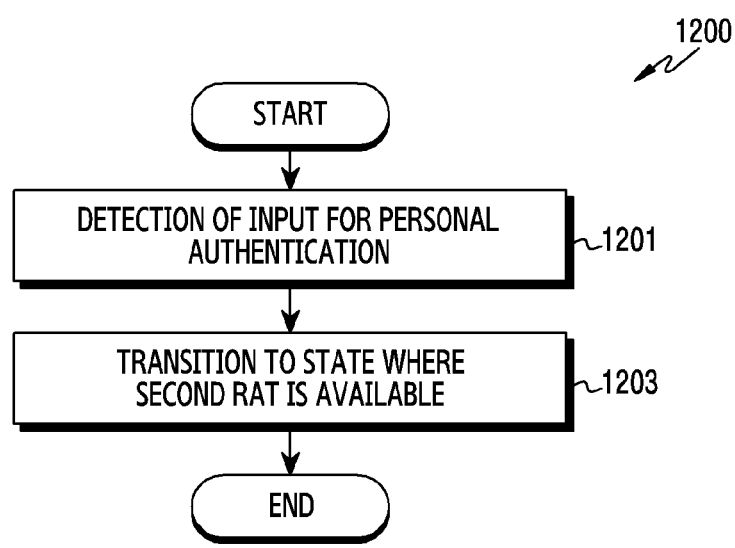
FIG. 12 illustrates a flowchart of a method of switching an electronic device to be in a state for expanding, via an expansion device, a wireless communication, according to an embodiment.

FIG. 12 illustrates a flowchart 1200 of a method of switching the electronic device 101 to be in a state for expanding, via the expansion device 202, a wireless communication, according to an embodiment. It may be understood that an operation subject of the flowchart 1200 illustrated in FIG. 12 indicates the electronic device 101 or an element of the electronic device 101 (for example, the processor 120).

Referring to FIG. 12, in operation 1201, the electronic device 101 detects an input for personal authentication. The input for personal authentication may include authentication by fingerprint recognition, authentication by iris recognition, and authentication by a touch input having a predetermined pattern with respect to the electronic device.

In operation 1203, the electronic device 101 is switched to be in a state where a communication using the second RAT is possible. For example, the electronic device 101 detects an input for personal authentication, and may be thus switched to be in a state where a communication using the second RAT with the expansion device 202 is possible.

Figure 14:
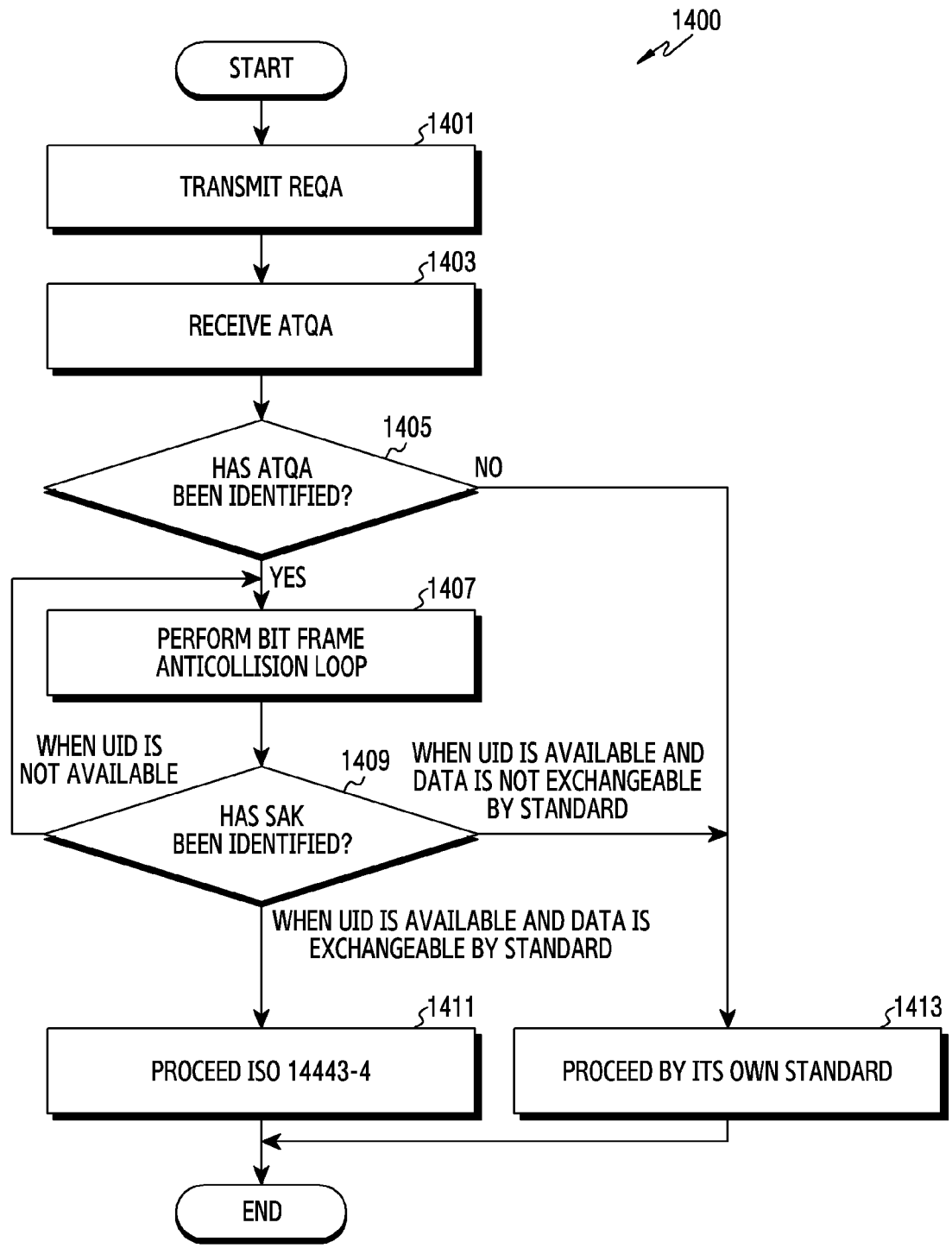
FIG. 14 illustrates a flowchart of a method of expanding, via an expansion device, a wireless communication between an electronic device and a reader, according to an embodiment.

FIG. 14 illustrates a flowchart 1400 of a method of expanding, via the expansion device 202, a wireless communication between the electronic device 101 and the reader 204, according to an embodiment. It may be understood that an operation subject of the flowchart 1400 illustrated in FIG. 14 indicates the expansion device 202 or an element of the expansion device 202 (for example, the processor 320). FIG. 14 illustrates operations conducted after the first RAT of the electronic device 101 is expanded to the second RAT.

Referring to FIG. 14, in operation 1401, the expansion device 202 may transmit an REQA message to the electronic device 101, and in operation 1403, the expansion device 202 may receive an ATQA message from the electronic device 101. In operation 1405, the expansion device 202 may identify information on the received ATQA message. For example, the expansion device 202 may determine whether data related to the first RAT of the electronic device 101 may be transmitted or received via the second RAT by a standard (for example, ISO 14443), based on the information on the received ATQA message. When the data related to the first RAT of the electronic device 101 may be transmitted or received via the second RAT by the standard, in operation 1407, the expansion device 202 may perform a bit frame anti-collision loop. When the data related to the first RAT of the electronic device 101 may not be transmitted or received via the second RAT by the standard, in operation 1413, the expansion device 202 may transmit or receive the data related to the first RAT of the electronic device 101 via the second RAT, based on its own standard. In operation 1409, the expansion device 202 may determine whether a unique identifier (UID) of the electronic device 101 is available and whether data can be exchanged by the standard, based on a select acknowledgment (SAK) message received from the electronic device 101. When the UID of the electronic device 101 is not available, in operation 1407, the expansion device 202 may perform a bit frame anti-collision loop. When the UID of the electronic device 101 is available and data can be exchanged by the standard, in operation 1411, the expansion device 202 may transmit or receive the data related to the first RAT of the electronic device 101 via the second RAT, based on the standard. When the UID of the electronic device 101 is available and data cannot be exchanged by the standard, in operation 1413, the expansion device 202 may transmit or receive the data related to the first RAT of the electronic device 101 via the second RAT, based on its own standard.

Figure 15:
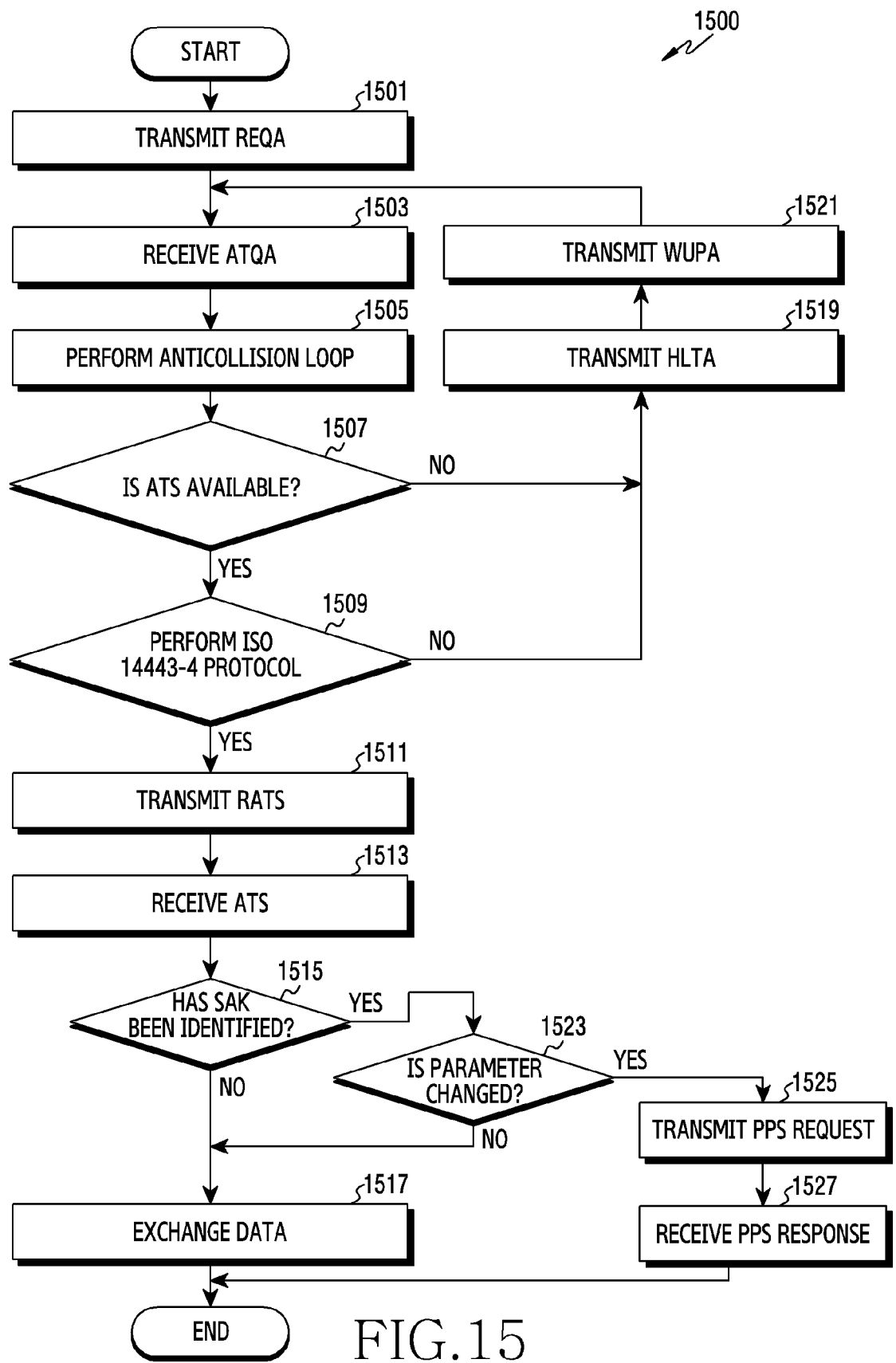
FIG. 15 illustrates a flowchart of a method of expanding, via an expansion device, a wireless communication between an electronic device and a reader, according to an embodiment.

FIG. 15 illustrates a flowchart 1500 of a method of expanding, via the expansion device 202, a wireless communication between the electronic device 101 and the reader 204, according to an embodiment. It may be understood that an operation subject of the flowchart 1500 illustrated in FIG. 15 indicates the expansion device 202 or an element of the expansion device 202 (for example, the processor 320). FIG. 15 illustrates operations conducted after the first RAT of the electronic device 101 is expanded to the second RAT.

Referring to FIG. 15, in operation 1501, the expansion device 202 may transmit an REQA message to the electronic device 101, and in operation 1503, the expansion device 202 may receive an ATQA message from the electronic device 101. In operation 1505, the expansion device 202 may perform a bit frame anti-collision loop. In operation 1507, the expansion device 202 may determine whether an ATS message is available in a process of transmitting or receiving data related to the first RAT of the electronic device 101 via the second RAT. For example, the expansion device 202 may determine, based on information on the received ATQA message, whether the ATS message is available in the process of transmitting or receiving the data related to the first RAT of the electronic device 101 via the second RAT. When the ATS message is available, in operation 1509, the expansion device 202 may determine whether an ISO14443-4 protocol is available in the process of transmitting or receiving the data related to the first RAT of the electronic device 101 via the second RAT. When the ISO14443-4 protocol is available, in operation 1511, the expansion device 202 may transmit an RATS message to the electronic device 101, and in operation 1513, the expansion device 202 may receive the ATS message from the electronic device 101. In operation 1515, the expansion device 202 may identify SAK and determine whether the process of transmitting or receiving the data related to the first RAT of the electronic device 101 via the second RAT supports PPS. When the ATS message is not available or the ISO14443-4 protocol is not available, in operation 1519, the expansion device 202 may transmit a holt type a (HLTA) message to the electronic device 101, and in operation 1521, the expansion device 202 may transmit a wakeup a command (WUPA) message to the electronic device 101. When the PPS is supported, in operation 1523, the expansion device 202 may determine whether to change a parameter which is used in the process of transmitting or receiving the data related to the first RAT of the electronic device 101 via the second RAT. When the parameter is changed, in operation 1525, the expansion device 202 may transmit a PPS request message to the electronic device 101, and in operation 1527, the expansion device 202 may receive a PPS response message from the electronic device 101. When the parameter is not changed or the PPS is not supported, in operation 1517, the expansion device 202 may transmit or receive the data related to the first RAT of the electronic device 101 via the second RAT.

According to an embodiment, an operation method of a first electronic device (for example, an electronic device 102) for expanding a wireless communication may include: transmitting, to at least one second electronic device (for example, an electronic device 101), a message requesting to initiate a communication using a second RAT; acquiring, from the at least one second electronic device, identification information of the at least one second electronic device via a communication using the second RAT; transmitting, to a reader (for example, an electronic device 104), the acquired identification information of the at least one second electronic device via a communication using a first RAT; and performing a communication using the first RAT between the at least one second electronic device and the reader by using the second RAT.

The electronic device according to an embodiment may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A first electronic device for expanding a wireless communication, the first electronic device comprising:
    a first radio access technology (RAT) communication unit configured to transmit a signal to or receive a signal from a reader via a first RAT;
    a second RAT communication unit configured to transmit a signal to or receive a signal from at least one second electronic device via a second RAT;
    a third RAT communication unit configured to transmit a signal to or receive a signal from the at least one second electronic device via a third RAT; and
    a processor configured to:
        transmit, to the at least one second electronic device, a message requesting to initiate communication using the second RAT via communication using the third RAT;
        determine a distance to the at least one second electronic device based on the signal transmitted and received through the communication using the second RAT; and
        when the determined distance to the at least one second electronic device is shorter than a predetermined first distance, control communication between the at least one second electronic device and the reader using the first RAT to be performed by using the second RAT.

2. The first electronic device of claim 1, wherein the first RAT is a near field communication (NFC),
    wherein the second RAT is an ultra-wide band communication, and
    wherein the third RAT is a bluetooth low energy (BLE) communication.

3. The first electronic device of claim 1, wherein the processor is further configured to perform control to transmit a message for waking up the at least one second electronic device.

4. The first electronic device of claim 1, wherein the processor is further configured to perform control to:
    receive the message requesting to initiate communication using the second RAT from the at least one second electronic device; and
    enable transition to a state where a communication using the second RAT with the at least one second electronic device is possible.

5. The first electronic device of claim 1, wherein the processor is further configured to perform control to:
    transmit, to the at least one second electronic device, a message for identifying a distance;
    receive, from the at least one second electronic device, a response message to the message for identifying the distance; and
    determine a distance to the at least one second electronic device, based on a transmission time of the message for identifying the distance and a reception time of the response message.

6. The first electronic device of claim 1, wherein the processor is further configured to:
    determine a distance to the at least one second electronic device; and
    when the determined distance to the at least one second electronic device is shorter than a predetermined second distance, perform control such that communication using the first RAT, between the at least one second electronic device and the reader, is performed by using the second RAT.

7. The first electronic device of claim 6, wherein the processor is further configured to perform control to:
transmit a message for a starting time to the at least one second electronic device via the second RAT;
receive, from the at least one second electronic device, a message for a return time via the second RAT; and
determine a distance to the at least one second electronic device, based on a transmission time of the message for a starting time and a reception time of the message for a return time.

8. The first electronic device of claim 1, wherein the processor is further configured to:
acquire, from the at least one second electronic device, identification information of the at least one second electronic device via a communication using the second RAT; and
perform control to transmit the acquired identification information of the at least one second electronic device to the reader via a communication using the first RAT.

9. The first electronic device of claim 1, wherein, when the at least one second electronic device detects an input for personal authentication and is switched to be in a state where the second RAT can be used, the processor is further configured to perform control to transmit, to the at least one second electronic device, a message for triggering the at least one second electronic device.

10. A second electronic device comprising:
a first RAT communication unit configured to transmit a signal to or receive a signal from a reader via a first RAT;
a second RAT communication unit configured to transmit a signal to or receive a signal from a first electronic device via a second RAT;
a third RAT communication unit configured to transmit a signal to or receive a signal from the first electronic device via a third RAT; and
a processor configured to:
receive, from the first electronic device, a message requesting to initiate communication using the second RAT via communication using the third RAT;
determine a distance to the first electronic device based on the signal transmitted and received through the communication using the second RAT; and
when the determined distance to the first electronic device is shorter than a predetermined first distance, control communication with the reader via the first electronic device using the first RAT to be performed by using the second RAT.

11. The second electronic device of claim 10, wherein the first RAT is a near field communication (NFC),
wherein the second RAT is an ultra-wide band communication, and
wherein the third RAT is a bluetooth low energy (BLE) communication.

12. The second electronic device of claim 10, wherein processor is further configured to perform control to:
receive, from the first electronic device, a message for waking up the second electronic device; and
wake up the second electronic device.

13. The second electronic device of claim 10, wherein the processor is further configured to perform control to:
receive a message requesting to initiate communication using the second RAT from the first electronic device; and
enable transition to a state where communication using the second RAT with the first electronic device is possible.

14. The second electronic device of claim 10, wherein the processor is further configured to perform control to:
receive, from the first electronic device, a message for identifying a distance; and
transmit, to the first electronic device, a response message to the message for identifying the distance.

15. The second electronic device of claim 10, wherein the processor is further configured to perform control to:
receive, from the first electronic device, a message for a starting time via the second RAT; and
transmit, to the first electronic device, a message for a return time via the second RAT.

16. The second electronic device of claim 10, wherein the processor is further configured to perform control to:
receive, from the first electronic device, a message requesting identification information of the second electronic device; and
transmit, to the first electronic device, the identification information of the second electronic device via a communication using the second RAT.

17. The second electronic device of claim 10, wherein the processor is further configured to:
detect an input for personal authentication; and
in response to the detected input for personal authentication, perform control to enable transition to a state where a communication using the second RAT with the first electronic device is possible.

18. The second electronic device of claim 17, wherein the input for personal authentication includes authentication by fingerprint recognition, authentication by iris recognition, and authentication by a touch input having a predetermined pattern with respect to the second electronic device.

19. A method of a first electronic device for expanding a wireless communication, the method comprising:
receiving, from at least one second electronic device, a message requesting to initiate a communication using a second RAT via communication using a third RAT;
acquiring, from the at least one second electronic device, identification information of the at least one second electronic device via a communication using the second RAT;
transmitting, to a reader, the acquired identification information of the at least one second electronic device via a communication using a first RAT; and
controlling communication between the at least one second electronic device and the reader using the first RAT to be performed by using the second RAT.

* * * * *